Patented Apr. 30, 1929.

1,711,189

UNITED STATES PATENT OFFICE.

LOUIS H. VON OHLSEN, OF NEW HAVEN, CONNECTICUT, ASSIGNOR TO THE SAFETY CAR HEATING & LIGHTING COMPANY, A CORPORATION OF NEW JERSEY.

STORAGE-BATTERY-CHARGING SYSTEM.

Application filed November 13, 1925. Serial No. 68,743.

This invention relates to the charging of storage batteries and more particularly to the charging and protection of storage batteries such as are used on electrically propelled vehicles for auxiliary purposes, such as the supplying of energy, for example, to signal lights, the control system of the cars or train, or even the primary illumination of the car or train. One of the objects of this invention is to provide a thoroughly practical yet simple system and apparatus for maintaining the storage battery approximately charged from the source of charging current which is generally of a relatively high voltage as compared with that of the storage battery itself. Another object is to provide such a system and apparatus which will be of efficient and dependable action and also thoroughly economical in practical use. Another object is to provide a system and apparatus embodying such features as those noted above in which the storage battery may be not only charged but also dependably safeguarded against over-charge irrespective of the various conditions of activity or inactivity of the vehicle or vehicles. Another object of this invention is to provide a system and apparatus of the above-mentioned character in which the above as well as other objects may be effectively carried out in practice to meet in a dependable manner the varied conditions of hard practical use. Other objects will be in part obvious or in part pointed out hereinafter.

The invention accordingly consists in the features of construction, combinations of elements, and arrangements of parts as will be exemplified in the structure to be hereinafter described and the scope of the application of which will be indicated in the following claims.

Figure 1:
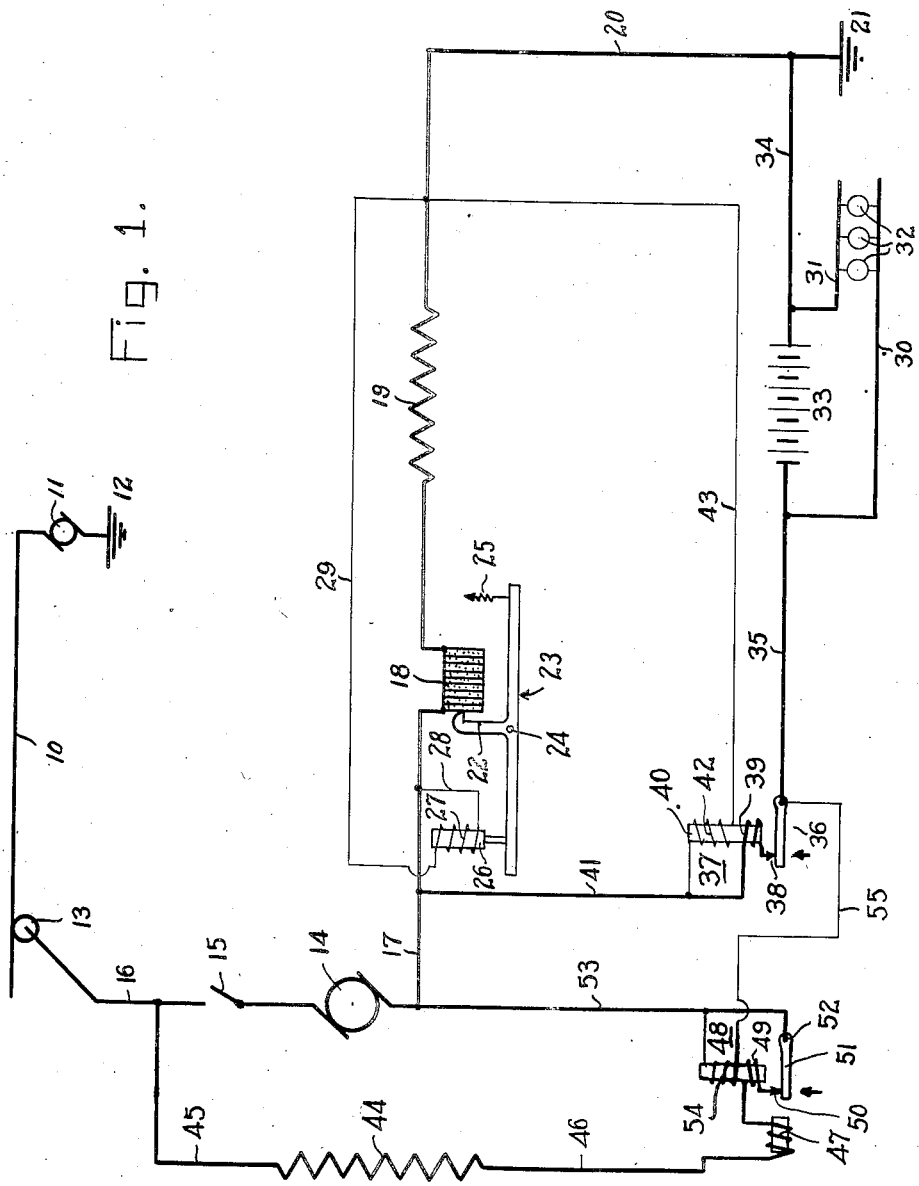
Figure 2:
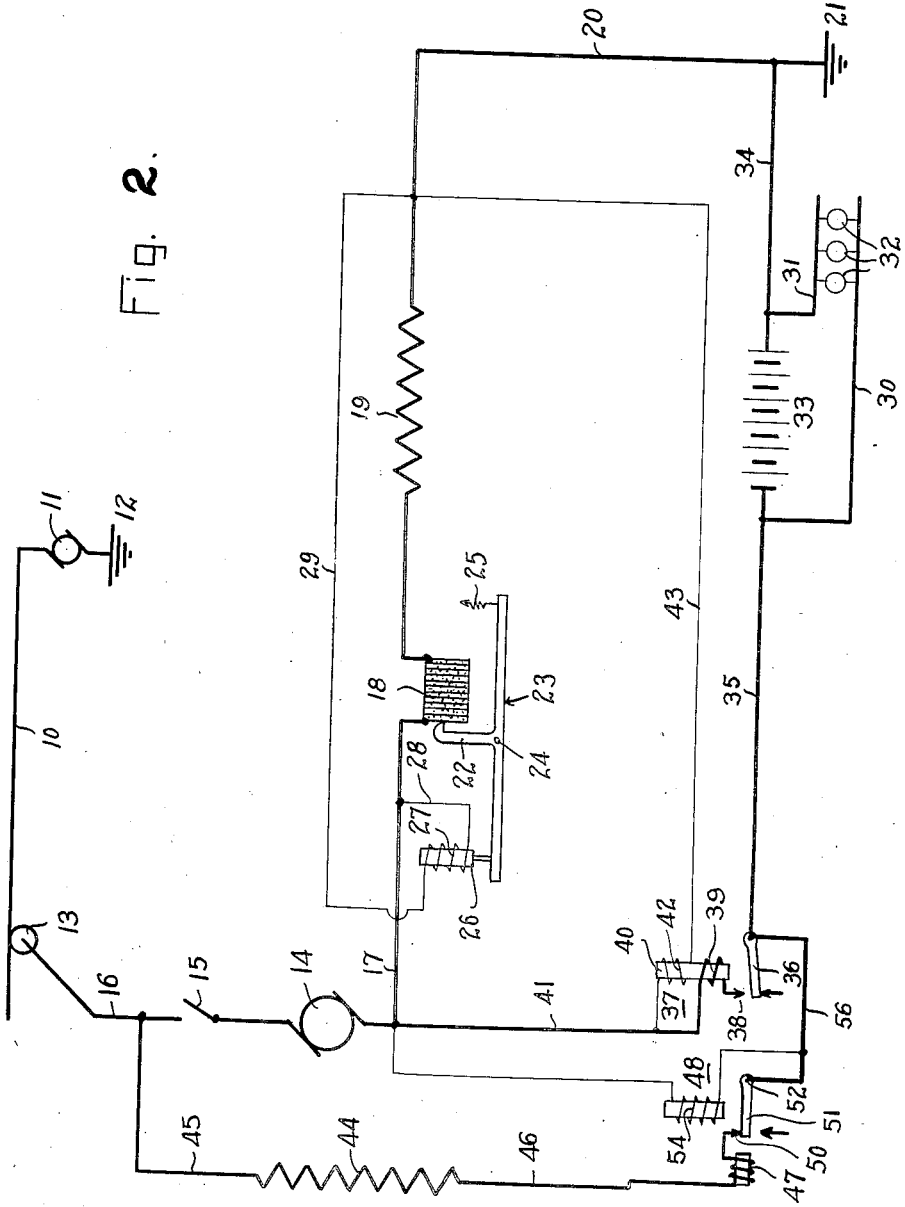

In the accompanying drawings there is diagrammatically illustrated in Figure 1 a preferred form of the various embodiments of which this invention is capable, and in Figure 2 is shown likewise diagrammatically a modified form of system embodying certain features of this invention.

Similar reference characters refer to similar parts throughout the various views of the drawings.

As conducive to a clearer understanding of certain features of this invention, it is desired to note at this point that in electrically propelled vehicles, particularly such as are used in subway or elevated transit service, there are usually provided various auxiliary circuits which are intended to operate at a voltage generally considerably less than the voltage of the power circuit from which the vehicle derives its driving energy. Such circuits may include the remote or multiple unit control systems or devices, signal lights or even the primary source of illumination for the vehicle, and in order to insure the supply of energy to such circuits as these and to their associated devices during periods when the main source of power is cut off, there is provided a storage battery; such a storage battery may and preferably takes the form of a sixteen cell battery in which case the average charging voltage may be considered to be in the neighborhood of forty volts, whereas the power or transmission circuit, supplying motive power to the vehicle or train, may have a voltage of, for example, six hundred volts. It is to the charging of a storage battery in such a relation and under the widely varying conditions of practical use to which such apparatus is subjected that this invention particularly relates and to provide a thoroughly dependable yet simple apparatus and system for insuring the adequate and at the same time protective charging of such a battery is one of the dominant aims of this invention.

Referring now to the drawings and more particularly to Figure 1, there is shown at 10 a transmission line which may take any suitable form connected to one side of a suitable source of current, such as a generator indicated at 11. This generator may supply energy to the transmission line at a voltage, for example, of 600 volts, and as is usually the case in railway practice, one side of the generator 10 is grounded as at 12. A current-collecting device indicated at 13 is carried by the vehicle and it may take any suitable form, such as a shoe or trolley so that the energy from the transmission conductor 10 may be collected as the vehicle is in transit or at rest.

The energy thus collected by way of the collecting device 13 may be utilized to operate various translating devices upon the car or vehicle and among these devices may be included, for example, the driving motor or motors of the car, or the motor which drives the air compressor for the vehicle air brake system. By way of illustration, there is indicated at 14 a motor which may be considered to be an air compressor motor, and the circuit of this motor may be controlled by a switch indicated at 15 which may take any suitable form either manual or automatic. The circuit of the motor 14 will be seen to extend from the current-collecting device 13, thence by way of conductor 16, switch 15, through the motor 14, conductor 17 and thence through a variable resistance unit which preferably takes the form of a carbon pile 18 and a fixed resistance 19, and then by way of conductor 20 to ground at 21.

The aggregate resistance of the resistance unit 18—19 may be varied as by varying the pressure upon the carbon pile 18, and acting upon the free or unanchored end of the pile 18 is one arm 22 of a bell crank lever 23 pivoted as at 24. A spring 25 is arranged to be operative upon the lever 23 in such a direction that it tends to relieve the pressure upon the carbon pile 18 and at the other end of the lever 23 there is connected the core 26 of a solenoid, the winding 27 of which is connected as by conductors 28 and 29 so as to be responsive to the voltage drop produced by the current passing through the resistance 18—19.

As illustrative of an auxiliary circuit with which the vehicle may be provided, there is indicated at 30—31 the conductors adapted to supply energy, for example, to lamps 32; the conductors 30—31 are connected to a storage battery 33 which in turn is arranged to be connected in parallel with the resistance 18—19 so that upon the closure of the circuit of the motor 14 by the switch 15, the storage battery 33 may receive charging current.

More specifically, one terminal of the storage battery 33 will be seen to be connected by conductor 34 to the conductor 20 which leads to ground at 21; the other terminal of the storage battery 33 will be seen to be connected by conductor 35 to the switch member 36 of an automatic switch generally indicated at 37, the closure of the switch 37 acting to extend the circuit of conductor 35 from switch contact 38, thence through a current coil 39 about a suitable core 40 of the switch 37 and thence by way of conductor 41 to conductor 17 and hence to the other side of the resistance unit 18—19. The automatic switch 37, furthermore, is provided with a lifting coil 42 connected as by conductors 41 and 43 to the respective sides of the resistance unit 18—19.

The closure of the circuit of motor 14 at the switch 15 and the resultant flow of current through the resistance 18—19 is effective first to bring about a sufficiently high voltage drop through the resistance unit 18—19 to cause the lifting coil 42 of switch 36 to be sufficiently energized to lift the switch member 37 and thus to connect the storage battery 33 in circuit with the motor 14; the spring 25 acting upon the bell crank lever 23 acts, during this initial action, to hold the pressure on the carbon pile 18 at a relatively low value so that the correspondingly high resistance of the resistance unit 18—19 is adequately effective through the resultant voltage drop to insure the closure of the automatic switch 37. Moreover, the lifting coil 42 of the latter may be arranged to be effective at a voltage appropriate to insure the charging of the battery 33.

After the switch 37 has closed as above described, the charging of the battery proceeds, the current passing through the motor 14 being divided between the battery 33 and the resistance unit 18—19 in parallel therewith. The coil 27 of the solenoid 26—27 is arranged to respond to a voltage substantially equivalent to that at which it is desired to substantially float the battery 33 as the latter approaches substantially full charge, and during the charging of the battery this coil is operative to prevent the impressing across the battery 33 of a voltage in excess of substantially this value; thus the battery is safeguarded against too high a rate of charge.

But as the battery approaches substantially full charge its back E. M. F. increases and approaches or substantially reaches the value at which the coil 27 of the solenoid 26—27 is effective, and the latter thus insures the proper floating of the battery and safeguards the latter against over-charge.

Should the circuit of motor 14 be at any time interrupted, the battery 33 would tend to discharge through the resistance unit 18—19 and the reversal of the flow of current through the coil 39 on the automatic switch 37 then brings about such an neutralization of the holding effort of holding coil 42 that the switch member 36 is released and the battery 33 disconnected.

Where the translating device takes the form of either the compressor driving motor or one or more of the vehicle driving motors, the latter may be and generally is but intermittently operative and, depending upon the character of the load which the storage battery 33 is called upon to supply, the periods of operation of the translating device, such as the motor 14, may be inadequate to insure the maintenance of the battery 33 in a proper state of charge. The disconnecting operation of the switching device 37 and resulting from the opening of the circuit of motor 14 is thus made effective to bring about the closure of an auxiliary charging circuit so that the charging of the battery may be continued. This auxiliary charging circuit preferably includes a resistance 44 of appropriate value, and the disconnecting operation of the switching device 37 is arranged in effect to bring about the substitution of the resistance 44 for the motor 14. The resistance 44 is included in a circuit which extends from the current-collecting device 13, thence by way of conductor 45, (then resistance 44) conductor 46, winding 47 of a blow-out coil appropriately positioned with respect to a switching device generally indicated at 48, then through the current-holding coil 49 of switch 48 to contact 50 of the latter; a switching member 51, pivoted as at 52, coacts with the switch contact 50, and is connected by conductor 53 to conductor 17 and hence to one side of the resistance unit 18—19, the other side of which is connected to ground at 21 and also to one side of the battery 33.

The switch 48 is provided with a lifting coil 54 which has one of its terminals connected to conductor 53 and hence by way of conductor 17 to one side of the resistance unit 18—19; the other terminal of lifting coil 54 of switch 48 is connected by conductor 55 to the switch member 36 of the automatic switch 37 and hence to one terminal of the battery 33.

The opening of the switch 37 in the manner hereinbefore described brings about the energization of lifting coil 54 by current from the battery 33 through a circuit which may be traced as follows:—from battery 33, conductors 35 and 55, coil 54, conductors 53 and 17, resistance unit 18—19 and thence by way of conductors 20 and 34 back to the other terminal of the battery 33.

The coil 54 of switch 48 being thus energized, the switch member 51 is lifted and the auxiliary charging circuit in which is included the resistance 44, is thereupon connected to conductor 17. The charging of the battery may thereupon proceed in very much the same manner as hereinbefore described, the resultant flow of current through the circuit in which is included resistance 44 and the resistance unit 18—19 causing such a voltage drop in the resistance unit 18—19 that the switch 37 is closed by the resultant energization of its lifting coil 42 and the solenoid 26—27 acting during the charge of the battery to safeguard the battery against over-voltage and hence against too high a charging rate, and also to safeguard the battery against over-charge at the substantial completion of its charge.

While the closure of the automatic switch 37, resulting as hereinabove described from the closure of the switch 48, causes the deenergization of the lifting coil 54 of the switch 48, yet the resultant flow of charging current through the holding coil 49 of switch 48 is effective to hold the switch 48 in dependable and reliable circuit-closing position as the charging of the battery thus continues.

Should the translating device or motor 14 have its circuit closed as at the switch 15 while the auxiliary charging circuit is in operation, such closure of the switch 15 causes such a decrease in the flow of current through the resistance 44 and the holding coil 49 (of switch 48) that the latter is ineffective to hold the switch 48 closed; the latter thereupon at once opens, any arcing thereby produced being counteracted by the action of the magnetic blow-out coil 47. Thus the auxiliary charging circuit is opened at the switch 48 by the substantial deenergization of holding coil 49, and during this action lifting coil 54 of switch 48 remains deenergized due to the fact that the switch 37 remains closed during this action because the lifting coil 42 of the latter may receive its energizing current by reason of the voltage drop produced through the resistance unit 18—19 by the flow of current resulting therethrough due to the closure of switch 15.

It will thus be seen that the storage battery may be dependably maintained under charge and reliably safeguarded against over-charge irrespective of whether or not the intermittently operated translating devices upon the circuit of which the storage battery primary depends for its charge are operated frequently enough to insure the charging of the battery. Moreover, it will be seen that the arrangement is well adapted to insure adequate charge to the storage battery even though the battery may be called upon to supply relatively heavy loads and that these advantages are achieved even though there exists such a wide divergence between the voltage of the storage battery and the voltage of the source of energy. The resistance 44 in the auxiliary charging circuit may, moreover, be proportioned to insure the flow of relatively heavy charging currents where the capacity of the battery 33 or the load thereon is relatively high and yet the battery may be adequately safeguarded against over-charge.

In Figure 2 of the drawings I have illustrated a possible modified embodiment of my invention, particularly adapted where the capacity of the battery may be less or the load supplied thereby smaller than may be the case where the arrangement hereinbefore described in connection with Figure 1 may be more desirable. In the system and appartus shown in Figure 2, the arrangement is such that upon the opening of the automatic switch 37, the battery 33 is directly connected but preferably through the action of the automatic switch 48 to the main source of current but through an auxiliary charging circuit in which is included the resistance 44 but which under certain circumstances it may be desirable to have of a relatively higher value than is the case with the arrangement of Figure 1 wherein it may be preferable to have the resistance 44 relatively lower. In Figure 2 the switch 48 is provided only with the lifting coil 54 and the opening of switch 37 causes the prompt energization of coil 48 with current from the battery 33, as hereinbefore described in connection with Figure 1, so that the battery 33 is then connected in a charging circuit which may be traced as follows:—from the main source of current 11 (grounded as at 12) transmission conductor 10, collecting device 13, conductor 45, resistance 44, conductor 46, blow-out coil 47, contact 50, switch member 51 conductor 56, conductor 35, storage battery 33 and thence by way of conductors 34 and 20 to ground at 21. The resistance 44 in the arrangement shown in Figure 2 is preferably so proportioned with respect to the voltage of the source 11 and the characteristics of the battery 33 that an adequate charging current is supplied the latter, and so that the rise in back voltage of the battery as the latter approaches substantially full charge may act to cut down the current flowing through the above-outlined charging circuit. In practice, the resistance 44 of Figure 2 may be furthermore so proportioned with respect to the load which the battery 33 may be called upon to supply substantially constantly, such as, for example, a number of signal lights when the vehicle or train is temporarily out of service, that the resultant flow of current in the circuit is adequate not only to supply such constant load but also to supply an adequate margin of charging current to the battery.

In the system and arrangement of Figure 2, it will be noted that the lifting coil 54 of the switch 48 is connected substantially directly across the switch contacts of the switch 37 so that the opening of the latter causes the closure of the auxiliary charging circuit and the closing of switch 37, as when the translating device 14 is made operative by closure of the switch 15, brings about the opening of the auxiliary charging circuit by reason of the deenergization of the lifting and holding coil 54 of switch 48.

It will thus be seen that there has been provided in this invention a system and apparatus in which the several objects hereinbefore set forth, as well as many thoroughly practical advantages, are successfully achieved, and that the system and apparatus is well adapted to meet the widely varying conditions of practical use, but all without endangering the storage battery by reason either of over-charge or over-discharge.

As many possible embodiments may be made of the above invention and as many changes might be made in the embodiment above set forth, it is to be understood that all matter hereinbefore set forth or shown in the accompanying drawings, is to be interpreted as illustrative and not in a limiting sense.

I claim as my invention:

1. In apparatus of the character described, in combination, a source of current, a circuit including a translating device arranged to receive current from said source through a resistance, a battery, switching means adapted upon said circuit being effective to connect said battery in parallel to said resistance and upon said circuit becoming ineffective to disconnect said battery therefrom, and means responsive to the potential difference across the contacts of said switching means for closing a by-pass circuit around said translating device.

2. In apparatus of the character described, in combination, a source of current, a circuit including a translating device arranged to receive current from said source through a resistance, a battery, switching means adapted upon said circuit being effective to connect said battery in parallel to said resistance and upon said circuit becoming ineffective to disconnect said battery therefrom, and means responsive to the disconnecting operation of said switching means for closing a by-pass circuit around said translating device.

3. In apparatus of the character described, in combination, a source of current, a circuit including a translating device arranged to receive current from said source through a resistance, a battery, switching means adapted upon said circuit being effective to connect said battery in parallel to said resistance and upon said circuit becoming ineffective to disconnect said battery therefrom, means for cutting down the flow of current to said battery as the latter approaches substantially full charge while permitting operation of said translating device, a second circuit arranged to have included therein said source of current and said battery, and means responsive to the disconnecting operation of said switching means adapted to close said second-mentioned circuit, said means for cutting down the flow of current to the battery being effective in either of said circuits.

4. In apparatus of the character described, in combination, a storage battery, a main charging circuit having included therein a translating device, an auxiliary charging circuit, and switching means adapted in response to said main charging circuit becoming effective to connect the battery thereto and upon said main charging circuit becoming ineffective to disconnect said battery therefrom and to connect the battery to said auxiliary charging circuit.

5. In apparatus of the character described, in combination, a storage battery, a main charging circuit having included therein a translating device, an auxiliary charging circuit, switching means adapted in response to said main charging circuit becoming effective to connect the battery thereto and upon said main charging circuit becoming ineffective to disconnect said battery therefrom and to connect the battery to said auxiliary charging circuit, and means for cutting down the flow of current to said battery as the latter approaches substantially full charge.

6. In apparatus of the character described, in combination, a storage battery, a main charging circuit therefor having included therein a current-consuming device, one terminal of which is connected to one terminal of said battery, an auxiliary charging circuit, switching means for connecting the other terminal of said battery to the remaining terminal of said current-consuming device in said main charging circuit, and means responsive to the potential difference across the contacts of said switching means for connecting said battery to said auxiliary charging circuit.

7. In apparatus of the character described, in combination, a storage battery, a main charging circuit therefor having included therein a current-consuming device, one terminal of which is connected to one terminal of said battery, an auxiliary charging circuit, switching means responsive to effective condition of said main charging circuit for connecting the other terminal of said battery to the other terminal of said device and adapted upon said main charging circuit becoming ineffective to disconnect said terminal of the battery from said terminal of the device, and means responsive to the potential difference across said switching means for connecting said battery to said auxiliary charging circuit.

8. In apparatus of the character described, in combination, a storage battery, a main charging circuit therefor having included therein a current-consuming device, one terminal of which is connected to one terminal of said battery, an auxiliary charging circuit, a switch for connecting the other terminal of said battery to the other terminal of said current-consuming device, and a switch having a coil connected across the contacts of said first-mentioned switch for connecting said battery to said auxiliary charging circuit.

9. In apparatus of the character described, in combination, a source of current having connected thereto a translating device and a resistance, a storage battery arranged in parallel to said resistance, a second resistance, and means responsive to inoperative condition of said translating device arranged to substitute said second-mentioned resistance for said translating device.

10. In apparatus of the character described, in combination, a source of current having connected thereto a translating device and a resistance arranged so that when current flows to said translating device current will also flow through said resistance, a storage battery arranged in parallel in said resistance, a second resistance, switching means adapted upon said translating device becoming ineffective to substitute therefor said second-mentioned resistance, and means for cutting down the flow of current to said battery as the latter approaches substantially full charge.

11. In apparatus of the character described, in combination, a source of current having connected thereto a translating device and a resistance in series, a storage battery arranged in parallel to said resistance, means responsive substantially to the state of charge of said battery for predetermining the amount of current to be by-passed through said resistance, a second resistance, and means responsive to ineffective condition of said translating device for substituting said second-mentioned resistance for said translating device.

12. In apparatus of the character described, in combination, a circuit having included therein a source of current, a translating device and a resistance in series, a storage battery, means responsive to effective condition of said circuit for connecting said battery in parallel to said resistance and adapted upon said circuit becoming ineffective to disconnect the battery therefrom, means responsive to the state of charge of said battery for predetermining the amount of current by-passed through said resistance, a second resistance, and means responsive to the disconnecting operation of said connecting means adapted to substitute said second-mentioned resistance for said translating device.

13. In apparatus of the character described, in combination, a circuit having included therein a source of current, a translating device and a resistance in series, a storage battery, switching means adapted upon said translating device becoming effective to connect said battery in parallel to said resistance and upon said translating device becoming ineffective to disconnect the battery therefrom, and means made effective by the disconnecting operation of said switching means for by-passing current around said ineffective translating device.

14. In apparatus of the character described, in combination, a circuit having included therein a source of current, a translating device and a resistance in series, a storage battery, switching means adapted upon said translating device becoming effective to connect said battery in parallel to said resistance and upon said translating device becoming ineffective to disconnect the battery therefrom, means for cutting down the flow of current to said battery as the latter approaches substantially full charge, and means made effective by the disconnecting operation of said switching means for by-passing current around said ineffective translating device.

15. In apparatus of the character described, in combination, a circuit having included therein a source of current, a translating device and a resistance in series, a storage battery, switching means adapted upon said translating device becoming effective to connect said battery in parallel to said resistance and upon said translating device becoming ineffective to disconnect the battery therefrom, a by-pass circuit around said translating device, and means responsive to ineffective condition of said translating device for closing said by-pass circuit and responsive to effective condition of said translating device for opening said by-pass circuit.

16. In apparatus of the character described, in combination, a circuit having included therein a source of current, a translating device and a resistance in series, a storage battery, switching means adapted upon said translating device becoming effective to connect said battery in parallel to said resistance and upon said translating device becoming ineffective to disconnect the battery therefrom, a by-pass circuit around said translating device, means responsive to ineffective condition of said translating device for closing said by-pass circuit and responsive to effective condition of said translating device for opening said by-pass circuit, and means responsive to the state of charge of the battery for cutting down the flow of current as the battery approaches substantially full charge.

17. In apparatus of the character described, in combination, a circuit having included therein a source of current, a translating device, a storage battery, means for by-passing current around said storage battery, circuit-controlling means responsive to effective condition of said translating device for causing a division of current between said by-pass means and said battery and adapted upon said translating device becoming ineffective, to prevent said battery from discharging through said by-pass means, a resistance, and means responsive to the potential difference across the contacts of said circuit-controlling means for connecting said resistance substantially in place of said translating device.

18. In apparatus of the character described, in combination, a circuit having included therein a source of current, a translating device, a storage battery, means for by-passing current around said storage battery, circuit-controlling means responsive to effective condition of said translating device for causing a division of current between said by-pass means and said battery and adapted upon said translating device becoming ineffective, to prevent said battery from discharging through said by-pass means, a by-pass circuit around said translating device, and a switch responsive to the disconnecting operation of said circuit-controlling means for closing said by-pass circuit and responsive to effective condition of said translating device for opening said by-pass circuit.

In testimony whereof, I have signed my name to this specification this 6th day of November, 1925.

LOUIS H. VON OHLSEN.